US008213301B2

(12) United States Patent
Park et al.

(10) Patent No.: US 8,213,301 B2
(45) Date of Patent: Jul. 3, 2012

(54) SYSTEMS AND METHODS FOR NETWORK CHANNEL CHARACTERISTIC MEASUREMENT AND NETWORK MANAGEMENT

(75) Inventors: Daniel J. Park, Beaverton, OR (US); Deepak Ayyagari, Vancouver, WA (US); George M. Peponides, Encinitas, CA (US); James E. Petranovich, San Diego, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 707 days.

(21) Appl. No.: 11/090,549

(22) Filed: Mar. 23, 2005

(65) Prior Publication Data

US 2005/0195968 A1 Sep. 8, 2005

Related U.S. Application Data (63) Continuation of application No. PCT/US2004/036796, filed on Nov. 5, 2004.

(60) Provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003, provisional application No. 60/537,492, filed on Jan. 19, 2004, provisional application No. 60/573,353, filed on May 21, 2004.

(51) Int. Cl.
*H04J 1/16* (2006.01)

(52) U.S. Cl. .......................... 370/229; 370/230; 370/468

(58) Field of Classification Search ............... 370/468, 370/469, 349, 401, 212, 230, 231, 250, 252, 370/274, 337, 392, 432, 350, 390, 400, 229, 370/445, 411, 389; 375/132, 141, 146, 147
See application file for complete search history.

(56) References Cited

U.S. PATENT DOCUMENTS

| 4,313,212 | A |   | 1/1982  | Whitlock |
|-----------|---|---|---------|----------|
| 4,477,809 | A | * | 10/1984 | Bose ........................... 340/10.41 |
| 5,130,983 | A | * | 7/1992  | Heffner, III .................. 370/449 |
| 5,402,413 | A |   | 3/1995  | Dixon |
| 5,495,483 | A |   | 2/1996  | Grube et al. |
| 5,541,955 | A |   | 7/1996  | Jacobsmeyer |
| 5,596,439 | A |   | 1/1997  | Dankberg et al. |
| 5,644,673 | A |   | 7/1997  | Patterson |
| 5,828,963 | A | * | 10/1998 | Grandhi et al. ............... 455/450 |
| 5,949,769 | A |   | 9/1999  | Davidson et al. |
| 6,006,271 | A |   | 12/1999 | Grabiec et al. |
| 6,038,455 | A |   | 3/2000  | Gardner et al. |
| 6,084,886 | A |   | 7/2000  | Dehner et al. |
| 6,097,700 | A | * | 8/2000  | Thornberg et al. ........... 370/233 |

(Continued)

FOREIGN PATENT DOCUMENTS

JP 05-304530 11/1993

(Continued)

OTHER PUBLICATIONS

U.S. Appl. No. 11/098,623 Office Action dated Aug. 15, 2008.

(Continued)

*Primary Examiner* — Chi Pham
*Assistant Examiner* — Abdullah Riyami
(74) *Attorney, Agent, or Firm* — Krieger Intellectual Property, Inc.; Scott C. Krieger (57) ABSTRACT

Embodiments of the present invention comprise systems and methods for detecting and applying network channel characteristic measurements.

9 Claims, 11 Drawing Sheets

U.S. PATENT DOCUMENTS

| | | | |
|---|---|---|---|
| 6,167,095 A | 12/2000 | Furukawa et al. | |
| 6,233,240 B1 | 5/2001 | Barbas et al. | |
| 6,278,723 B1 | 8/2001 | Meihofer et al. | |
| 6,278,883 B1 | 8/2001 | Choi | |
| 6,400,819 B1 | 6/2002 | Nakano et al. | |
| 6,408,033 B1 | 6/2002 | Chow et al. | |
| 6,480,506 B1* | 11/2002 | Gubbi | 370/468 |
| 6,522,635 B1* | 2/2003 | Bedwell | 370/314 |
| 6,618,366 B1 | 9/2003 | Furukawa et al. | |
| 6,668,175 B1 | 12/2003 | Almgren et al. | |
| 6,674,750 B1 | 1/2004 | Castellano | |
| 6,700,875 B1* | 3/2004 | Schroeder et al. | 370/252 |
| 6,718,393 B1 | 4/2004 | Aditya | |
| 6,741,554 B2* | 5/2004 | D'Amico et al. | 370/225 |
| 6,754,176 B1* | 6/2004 | Gubbi et al. | 370/230 |
| 6,763,384 B1 | 7/2004 | Gupta | |
| 6,795,418 B2 | 9/2004 | Choi | |
| 6,826,186 B1 | 11/2004 | Ditta et al. | |
| 6,829,227 B1* | 12/2004 | Pitt et al. | 370/329 |
| 6,847,653 B1* | 1/2005 | Smiroldo | 370/462 |
| 6,850,981 B1 | 2/2005 | Ho et al. | |
| 6,865,609 B1* | 3/2005 | Gubbi et al. | 709/230 |
| 6,877,043 B2 | 4/2005 | Mallory et al. | |
| 6,891,841 B2 | 5/2005 | Leatherbury et al. | |
| 6,934,554 B2 | 8/2005 | Mizuno et al. | |
| 6,934,752 B1* | 8/2005 | Gubbi | 709/225 |
| 6,947,748 B2* | 9/2005 | Li et al. | 455/450 |
| 7,050,452 B2 | 5/2006 | Sugar et al. | |
| 7,072,315 B1 | 7/2006 | Hui et al. | |
| 7,076,220 B2 | 7/2006 | Backes et al. | |
| 7,110,366 B2 | 9/2006 | Hulyalkar et al. | |
| 7,110,380 B2 | 9/2006 | Shvodian | |
| 7,151,558 B1 | 12/2006 | Kogane | |
| 7,180,884 B2 | 2/2007 | Elliott | |
| 7,233,991 B2 | 6/2007 | Adhikari | |
| 7,269,185 B2 | 9/2007 | Kirkby et al. | |
| 7,295,518 B1 | 11/2007 | Monk et al. | |
| 7,298,289 B1* | 11/2007 | Hoffberg | 340/903 |
| 7,315,573 B2 | 1/2008 | Lusky et al. | |
| 7,561,539 B2 | 7/2009 | Sugaya | |
| 7,756,041 B2* | 7/2010 | Whitehill et al. | 370/238 |
| 2001/0037412 A1 | 11/2001 | Miloushev et al. | |
| 2002/0022483 A1 | 2/2002 | Thompson et al. | |
| 2002/0062472 A1 | 5/2002 | Medlock et al. | |
| 2002/0094011 A1 | 7/2002 | Okumura et al. | |
| 2002/0133589 A1* | 9/2002 | Gubbi et al. | 709/225 |
| 2002/0137467 A1 | 9/2002 | Tzannes | |
| 2002/0159418 A1 | 10/2002 | Rudnick et al. | |
| 2002/0163928 A1 | 11/2002 | Rudnick et al. | |
| 2003/0002529 A1 | 1/2003 | Kurdzinski et al. | |
| 2003/0012166 A1 | 1/2003 | Benveniste | |
| 2003/0012167 A1 | 1/2003 | Benveniste | |
| 2003/0012176 A1 | 1/2003 | Kondylis et al. | |
| 2003/0016732 A1* | 1/2003 | Miklos et al. | 375/132 |
| 2003/0040319 A1 | 2/2003 | Hansen et al. | |
| 2003/0067892 A1 | 4/2003 | Beyer et al. | |
| 2003/0081603 A1* | 5/2003 | Rune | 370/390 |
| 2003/0084283 A1 | 5/2003 | Pixton | |
| 2003/0126536 A1* | 7/2003 | Gollamudi et al. | 714/748 |
| 2003/0147368 A1 | 8/2003 | Eitan et al. | |
| 2003/0161268 A1 | 8/2003 | Larsson et al. | |
| 2003/0161340 A1 | 8/2003 | Sherman | |
| 2003/0169697 A1 | 9/2003 | Suzuki | |
| 2003/0174665 A1 | 9/2003 | Benveniste | |
| 2003/0181165 A1 | 9/2003 | Sugar et al. | |
| 2003/0199279 A1 | 10/2003 | Roberts | |
| 2003/0224787 A1 | 12/2003 | Gandolfo | |
| 2003/0231621 A1* | 12/2003 | Gubbi et al. | 370/352 |
| 2003/0231715 A1 | 12/2003 | Shoemake et al. | |
| 2004/0001429 A1 | 1/2004 | Ma et al. | |
| 2004/0013102 A1 | 1/2004 | Fong et al. | |
| 2004/0013135 A1 | 1/2004 | Haddad | |
| 2004/0022181 A1 | 2/2004 | Coffey | |
| 2004/0053621 A1 | 3/2004 | Sugaya | |
| 2004/0058686 A1 | 3/2004 | Odman | |
| 2004/0059825 A1* | 3/2004 | Edwards et al. | 709/230 |
| 2004/0062229 A1 | 4/2004 | Ayyagari et al. | |
| 2004/0066738 A1 | 4/2004 | Stopler | |
| 2004/0066743 A1* | 4/2004 | Shimojo et al. | 370/229 |
| 2004/0100897 A1* | 5/2004 | Shattil | 370/206 |
| 2004/0125786 A1 | 7/2004 | Fuchs | |
| 2004/0136393 A1 | 7/2004 | Insua et al. | |
| 2004/0166869 A1* | 8/2004 | Laroia et al. | 455/450 |
| 2004/0184398 A1* | 9/2004 | Walton et al. | 370/203 |
| 2004/0224634 A1* | 11/2004 | Kim | 455/13.4 |
| 2004/0224676 A1* | 11/2004 | Iseki | 455/420 |
| 2005/0030890 A1* | 2/2005 | Benco et al. | 370/229 |
| 2005/0030967 A1 | 2/2005 | Ohmi | |
| 2005/0192037 A1 | 9/2005 | Nanda et al. | |
| 2006/0039275 A1* | 2/2006 | Walton et al. | 370/208 |
| 2006/0114826 A1* | 6/2006 | Brommer | 370/230 |
| 2006/0159041 A1* | 7/2006 | Zhun | 370/328 |
| 2006/0227706 A1* | 10/2006 | Burst | 370/229 |
| 2006/0250973 A1* | 11/2006 | Trott | 370/252 |
| 2006/0251098 A1 | 11/2006 | Morioka | |
| 2007/0160002 A1* | 7/2007 | Wolman et al. | 370/328 |
| 2007/0211786 A1* | 9/2007 | Shattil | 375/141 |
| 2008/0039148 A1* | 2/2008 | Rudolf | 455/562.1 |

FOREIGN PATENT DOCUMENTS

| | | |
|---|---|---|
| JP | 11-205352 | 7/1999 |
| JP | 2000-165930 | 6/2000 |
| JP | 2004-503181 | 1/2002 |
| JP | 2004-537875 | 6/2002 |
| JP | 2003-110571 | 4/2003 |
| JP | 2003-249936 | 9/2003 |
| WO | WO00/74322 | 12/2000 |
| WO | WO02/41586 | 5/2002 |

OTHER PUBLICATIONS

U.S. Appl. No. 11/089,626 Office Action dated Feb. 2, 2009.
U.S. Appl. No. 11/089,629 Office Action dated Jul. 23, 2008.
U.S. Appl. No. 11/089,629 Office Action dated Jan. 16, 2009.
U.S. Appl. No. 11/089,759 Office Action dated Aug. 4, 2008.
U.S. Appl. No. 11/089,759 Office Action dated Jan. 26, 2009.
U.S. Appl. No. 11/089,882 Office Action dated Feb. 24, 2009.
U.S. Appl. No. 11/089,756 Office Action dated Jul. 21, 2008.
U.S. Appl. No. 11/089,756 Office Action dated Dec. 24, 2008.
International Application No. PCT/US04/036798 International Preliminary Examination Report, Jun. 1, 2006.
European Search Report for PCT/US 2004036797 corresponding to U.S. Appl. No. 11/089,882 which has technical similarities to the present application, Apr. 1, 2010.
Japanese Office Action JP2007-503890 corresponding to U.S. Appl. No. 11/089,759 which has technical similarities to the present application, Feb. 2, 2010.
Japanese Office Action JP2007-527184 corresponding to U.S. Appl. No. 11/089,756 which has technical similarities to the present application, Feb. 26 2010.
Japanese Office Action JP2006-538487 corresponding to U.S. Appl. No. 11/089,792 which has technical similarities to the present application, Mar. 16, 2010.
Decision of Rejection for JP2006-538487 corresponding to U.S. Appl. No. 11/089,792 which has technical similarities to the present application, Mar. 16, 2010.
U.S. Appl. No. 11/089,623—Non-Final Office Action dated Feb. 2, 2009.
U.S. Appl. No. 11/089,623—Non-Final Office Action dated Mar. 16, 2010.
U.S. Appl. No. 11/089,756—Notice of Allowance dated May 27, 2010.
U.S. Appl. No. 11/089,756—Office Action dated Sep. 10, 2009.
U.S. Appl. No. 11/089,759—Notice of Allowance dated Oct. 8, 2009.
U.S. Appl. No. 11/089,792—Notice of Allowance dated Jan. 28, 2008.
U.S. Appl. No. 11/089,623—Office Action dated Sep. 17, 2009.
U.S. Appl. No. 11/089,882—Office Action dated Oct. 8, 2009.
European Search Report for PCT/US2004036785 corresponding to U.S. Appl. No. 11/089,629 which has technical similarities to the present application, Nov. 19, 2009.
Japanese Office Action JP2006-538485 corresponding to U.S. Appl. No. 11/090,549 which has technical similarities to the present application, Jul. 7, 2009.

International Application No. PCT/US04/036797 International Search Report, Apr. 14, 2005.
International Application No. PCT/US04/036797 International Preliminary Examination Report, May 18, 2006.
International Application No. PCT/US04/036798 International Search Report, Jun. 1, 2006.
International Application No. PCT/US04/036798 International Search Report, Mar. 7, 2005.
International Application No. PCT/US04/036799 International Preliminary Examination Report, May 18, 2006.
International Application No. PCT/US04/036799 International Search Report, Apr. 22, 2005.
International Application No. PCT/US04/036786 International Preliminary Examination Report, Nov. 21, 2006.
International Application No. PCT/US04/036786 International Search Report, May 3, 2005.
International Application No. PCT/US04/036796 International Preliminary Examination Report, May 18, 2006.
International Application No. PCT/US04/036796 International Search Report, Aug. 19, 2005.
International Application No. PCT/US04/036969 International Preliminary Examination Report, May 18, 2006.
International Application No. PCT/US04/036969 International Search Report May 4, 2005.
International Application No. PCT/US04/036785 International Preliminary Examination Report, Jun. 5, 2007.
International Application No. PCT/US04/036785 International Search Report A, May 24, 2007.
International Application No. PCT/US04/036785 International Search Report B, May 26, 2005.
U.S. Appl. No. 11/089,882—Office Action dated May 21, 2008.
U.S. Appl. No. 11/089,792—Office Action dated Feb. 21, 2006.
U.S. Appl. No. 11/089,792—Office Action dated Mar. 28, 2006.
U.S. Appl. No. 11/089,792—Office Action dated Nov. 6, 2006.
U.S. Appl. No. 11/089,792—Office Action dated Apr. 25, 2007.
U.S. Appl. No. 11/089,792—Office Action dated Aug. 8, 2007.

* cited by examiner

SYSTEMS AND METHODS FOR NETWORK CHANNEL CHARACTERISTIC MEASUREMENT AND NETWORK MANAGEMENT

CROSS-REFERENCE TO RELATED APPLICATIONS

This application is a continuation of International Patent Application No. PCT/US2004/36796 filed on Nov. 5, 2004 which claims the benefit of U.S. Provisional Patent Applications: Nos. 60/518,036 filed Nov. 7, 2003 entitled "OFDMA (FDM+TDM) Schedulers for OFDM PHY's"; No. 60/518, 036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In communication systems which transmit data over a wide band of frequencies, it is often useful to segment the frequency band into multiple sub-channels (or tones). Each of these sub-channels carries a portion of the total information sent from the source device to the destination device.

The proportion of data transmitted on each of the different sub-channels is often configured based on factors such as the data carrying capacity of the sub-channel. The data carrying capacity of a sub-channel is related to its bandwidth and the physical signaling conditions of the sub-channel.

In communications systems such as power line communication systems and others, it is desirable to maximize the throughput on the set of sub-channels allocated to a connection between two devices. In order to maximize the amount of information a sub-channel can carry, the system must characterize the transfer function of the channel by making measurements of the channel. These measurements may include, but are not limited to, such attributes as signal to noise ratio (SNR), channel error rates (e.g. bit error rates, symbol error rates, packet error rates), phase noise and adjacent channel interference.

In order to take measurements on the sub-channels, the communication system may allocate a percentage of the transmission time or other network resources for this purpose. The channel measurements thus may have a negative effect (reduced bandwidth) on the ability of the channel to carry data. However, it is expected that the net gain in channel bandwidth is positive due to the increased performance obtained from the channel by using the measurements to maximize the throughput of the individual sub-channels.

BRIEF SUMMARY OF THE INVENTION

Embodiments of the present invention comprise systems and methods for network channel characteristic measurement and channel allocation.

The foregoing and other objectives, features, and advantages of the invention will be more readily understood upon consideration of the following detailed description of the invention taken in conjunction with the accompanying drawings.

DETAILED DESCRIPTION OF PREFERRED EMBODIMENTS

Known systems, such as HomePlug Version 1.0, measure the performance of the communication channel between devices with a process called channel estimation. In this process, the source station may request that the destination station measure the performance of the channel (on the request message) and return the result of the measurement to the source device. This resulting information is then used for further transmissions, at a presumed more efficient utilization of the channel. The transmission of the channel estimation request by the source device consumes channel bandwidth. This bandwidth used for channel estimation reduces the amount of bandwidth available to carry user traffic which may adversely impact the ability of the system to meet the Quality of Service (QoS) requirement of active connections.

Devices within a communication system which use a shared medium, such as a residential power line, may estimate the performance of the channel on demand from either of the two devices (destination or source). The relative priority of the channel estimation requests and responses can be managed by the devices with respect to their local traffic. That is, channel estimation traffic may be given more or less priority in relation to other traffic for which the devices have knowledge. Relative priority of traffic between other devices and the channel estimation traffic between the two devices of interest may be managed by setting a global priority which is applied when the traffic contends for access to the shared channel. Again, channel estimation traffic may impact the ability of the network to meet the QoS requirements of connections between devices not involved in the channel estimation process.

Channel estimation results may be sent from the destination station to the source station so that the source station can use the most efficient channel encoding when sending its user traffic to the destination. When the channel conditions are dynamic, the destination station must notify the source station when channel conditions have changed significantly such that new encodings are required. Generally, the destination station monitors the reception quality of the transmissions from the source. If the reception quality changes significantly for the worse (or better) the destination station will send a notice to the source to use a new encoding or to initiate a new channel estimation procedure. The notification of channel condition changes are generally exchanged between pairs of source and destination devices.

Figure 1:
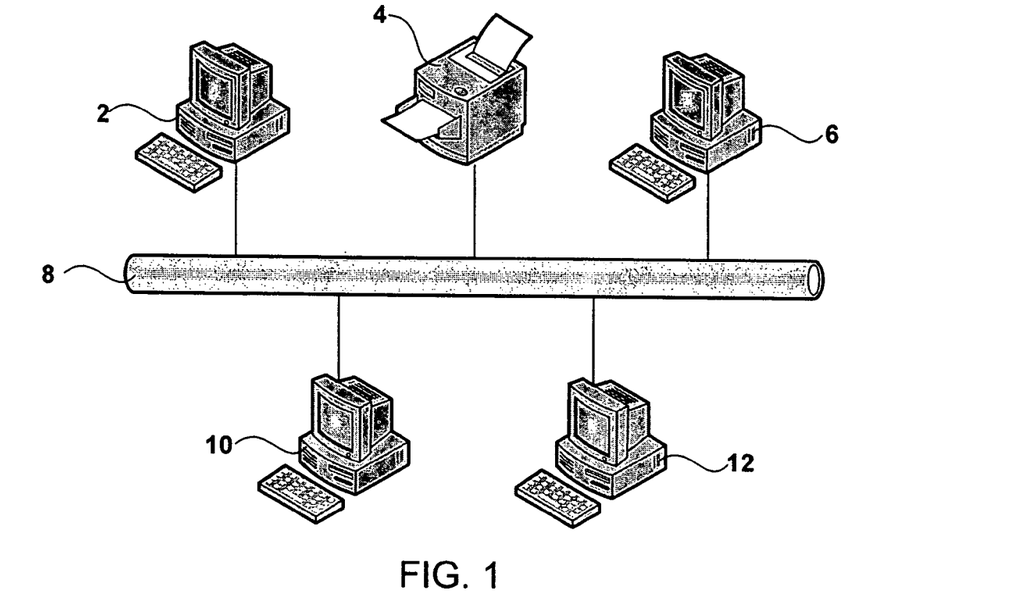
FIG. 1 is a diagram of an exemplary network.

Embodiments of the present invention may be incorporated as part of a power line networking system, a wireless networking system or some other type of networking system. An exemplary network is shown in FIG. 1. In this exemplary network, network devices 2, 4, 6, 10 & 12 communicate via a communications medium 8. Computing devices 2, 4, 6, 10 & 12 may comprise typical desktop and portable computers, Personal Digital Assistants (PDAs), printers, Multi-Function Peripherals (MFPs), cell phones and many other devices. In these embodiments, practically any network device 2, 4, 6, 10 & 12 that has processing ability may perform the functions of a Central Coordinator (CCo).

In the network of some of these embodiments, the transmission channel between devices may be characterized at each receiving device in a procedure called sounding. The results of the sounding process may be passed to a central device, called the Central Coordinator (CCo), where a network wide view of the channel conditions may be maintained.

In an exemplary system, the frequency band of 4 MHz to 28 MHz may be divided into 614 sub-channels which can be individually allocated to connections by the CCo. The CCo may also partition time into 133 millisecond frames which may be further divided into 256 timeslots. Timeslot 0 of each frame may contain a beacon transmission from the CCo to all other devices on the network. This beacon may contain control messages including an assignment of source devices to each scheduled transmission in the frame. In this exemplary system, the CCo may control access to the network by allocating a set of tones and timeslots to devices that have data to transmit.

Some embodiments of the present invention may be described with reference to an exemplary network system known as Avalanche PLC, which is described in detail in the reference, *Power Line Communications (PLC) AV, Avalanche Protocol Specification; Version* 0.4.1, Oct. 8, 2003, which is hereby incorporated herein by reference.

In some embodiments of the present invention, the measurement of the channel conditions between any two devices may be performed both opportunistically and by direction of a CCo on the network. The opportunistic measurements may be performed whenever a device broadcasts on the network, when select broadcasts occur or at some interval. Broadcasts may occur not only for the transfer of user information, but also as a part of a device discovery process. Because all devices broadcast on the network periodically for purposes other than channel estimation and because receiving devices are able to make channel measurements on these broadcasts, network bandwidth for the sole purpose of channel estimation is reduced or eliminated.

Figure 2:
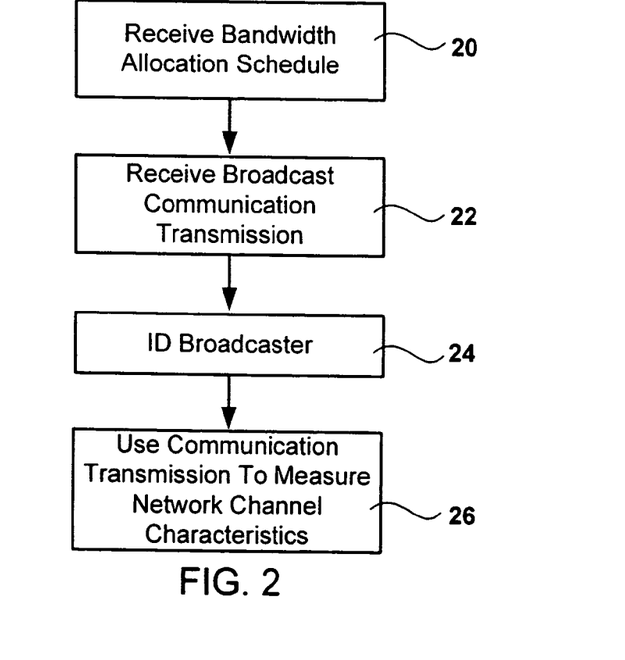
FIG. 2 is a chart showing steps of a method for measuring network channel characteristics.

Some embodiments of the present invention may be explained with reference to FIG. 2. In these embodiments a network device receives 20 a bandwidth allocation schedule, which designates which devices may use specified tones and time slots. With this schedule, any network device can identify which device is transmitting on the network at any given time and frequency. A network device, then receives 22 a broadcast communication transmission. This is a communication message that is intended for communication between devices and that is not primarily designed for network sounding or channel characteristic measurement. Once a communication transmission is received, the broadcaster or transmitting device can be identified 24 using the schedule 20 or by other methods. With the source transmitting device identified, and the transmission received, a receiving device can use this data to measure 26 the network channel characteristics.

Figure 3:
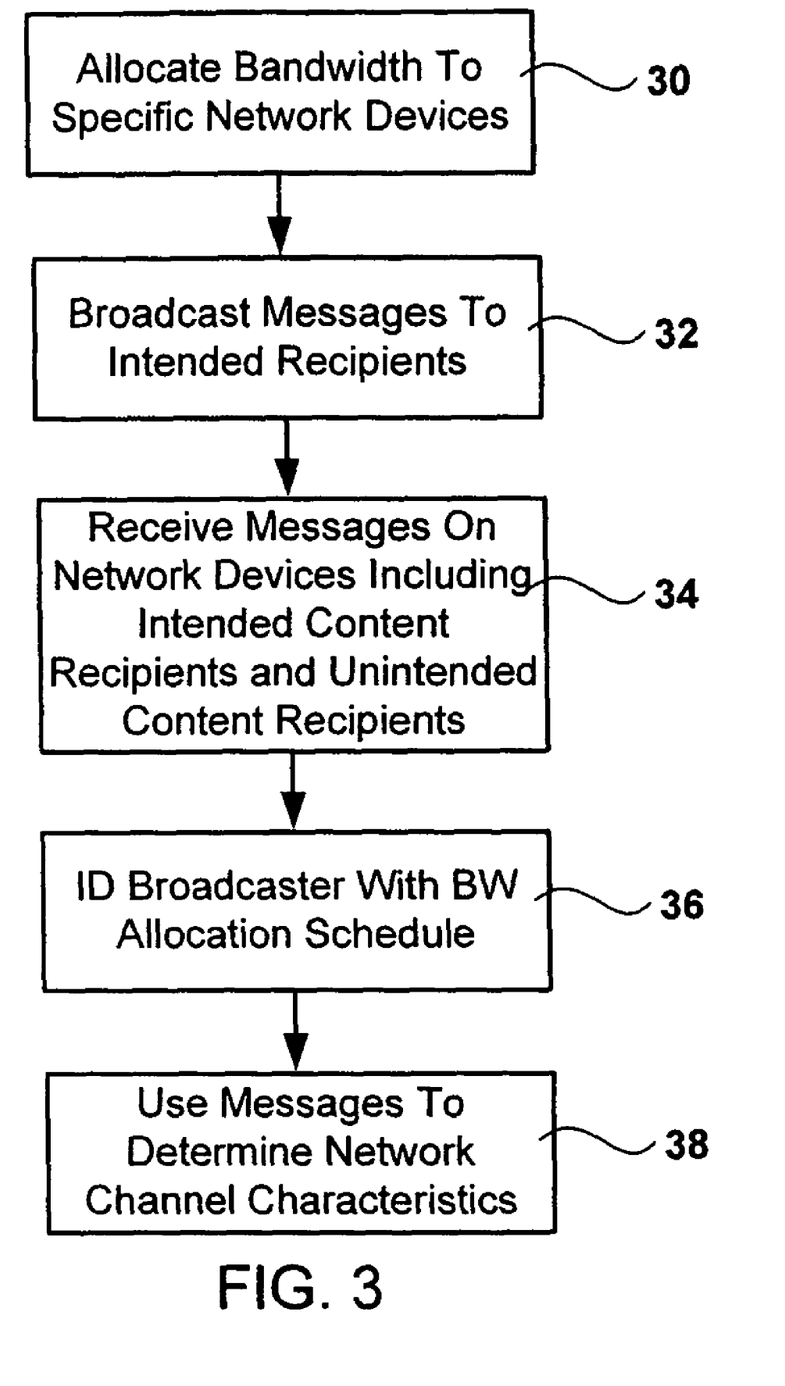
FIG. 3 is a chart showing steps of a method for measuring network channel characteristics with intended content recipients and non-intended content recipients.

Other embodiments of the present invention may be described with reference to FIG. 3. In these embodiments, bandwidth is allocated 30 to specific network devices either by a Central Coordinator (CCo) or by other methods. Typical network traffic comprising broadcast messages are then sent 32 according to the allocation. These broadcast messages are received 34 by their intended recipients as well as other devices on the network. The broadcasting device is identified 36 by all recipients with the bandwidth allocation schedule or by other information. Once broadcast sources are identified, network devices can use the messages to determine network channel characteristics 38.

Figure 4:
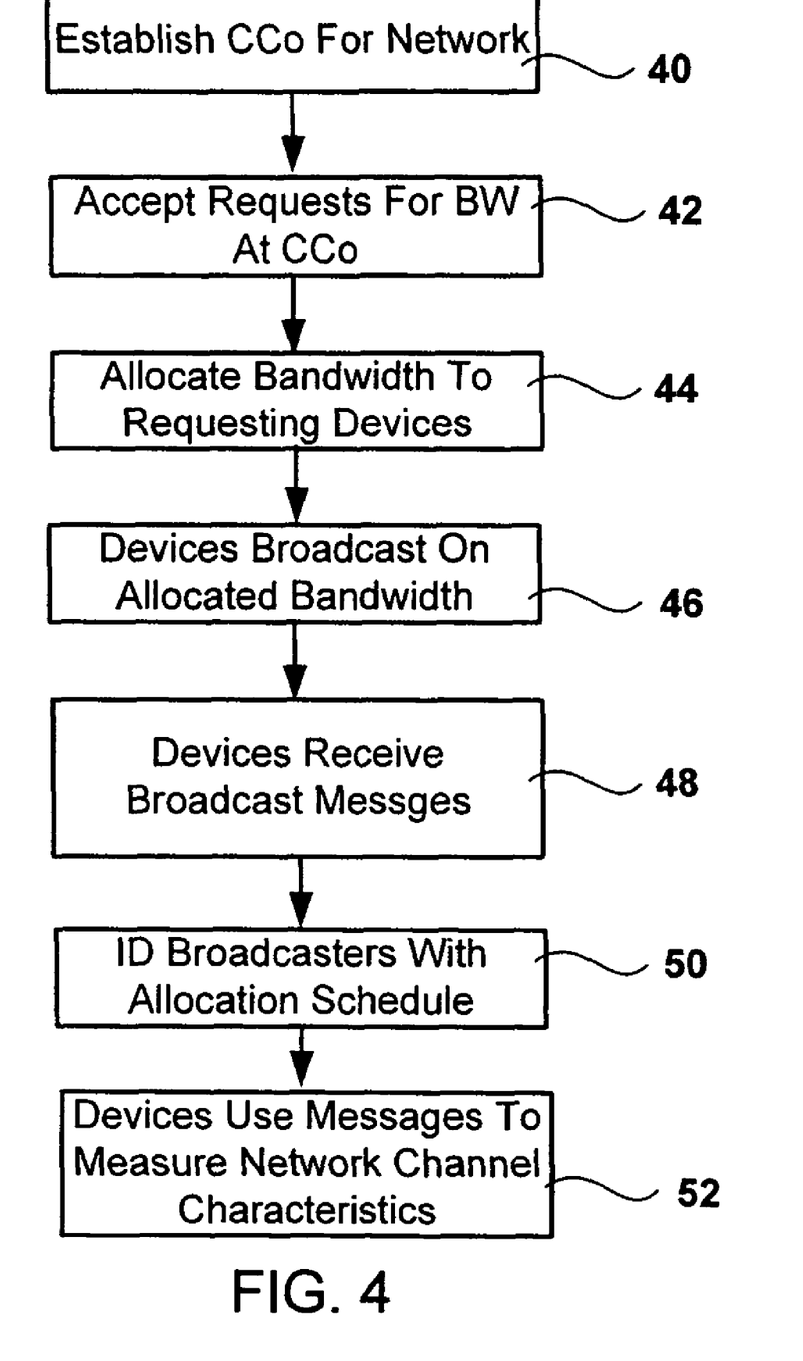
FIG. 4 is a chart showing steps of a method for measuring network channel characteristics and identifying broadcasters by an allocation schedule.
Figure 5:
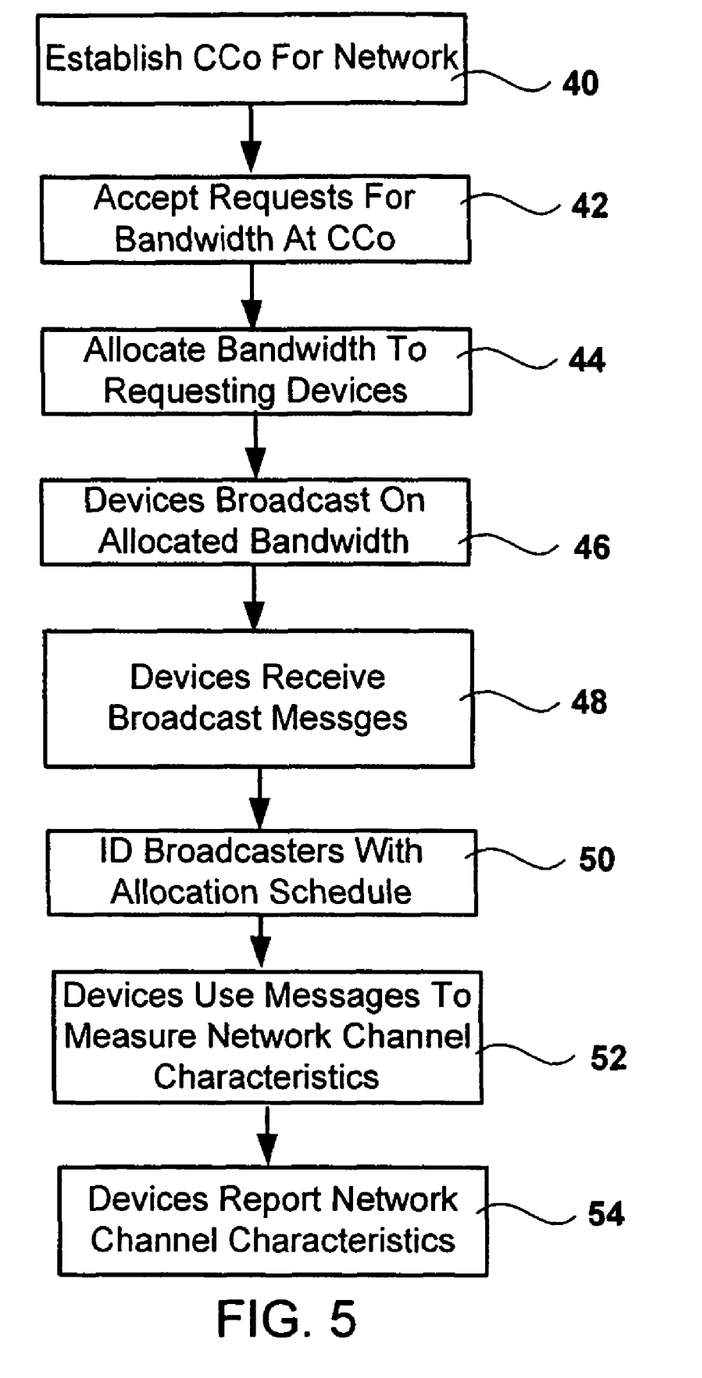
FIG. 5 is a chart showing steps of a method for measuring network channel characteristics and reporting channel characteristics.

In some embodiments of the present invention as illustrated in FIGS. 4 and 5, a CCo is established 40 and requests for bandwidth are accepted 42 by the CCo from network devices. The CCo then allocates 44 bandwidth to the requesting devices. Devices then transmit 46 messages according to their allocations and network devices receive 48 these messages. The source of each message may be ascertained 50 with the information in the allocation schedule. With source and destination known, the messages can be used to measure 52 network channel characteristics between specific devices. When network channel characteristics are maintained by a CCo, as illustrated in FIG. 5, network devices may report 54 their measurements to the CCo.

Figure 6:
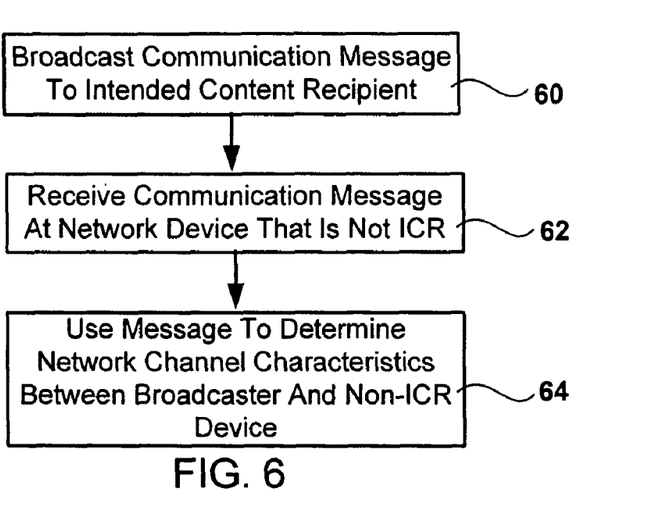
FIG. 6 is a chart showing steps of a method for measuring network channel characteristics by a non-intended content recipient.

In many embodiments, a network communication message may have a dual purpose. Some embodiments, illustrated in FIG. 6, a communication message is broadcast 60 to an intended content recipient (ICR). That communication message is received by the ICR and the communication content is extracted for the recipient. However, this message may also be received by other devices 62, which have no use for the communication content, but which may use the message for network channel characteristic measurements 64 between the broadcaster/transmitter and the measuring device. In this manner, a single broadcast message may be used to measure network channel characteristics between a broadcasting device and all other devices on the network.

In some of these embodiments, only the ICR will be capable of receiving the communication content of the message. Information in the message may be encrypted or otherwise protected to prevent unintended recipients from receiving sensitive information.

In the case that a source device does not have accurate channel estimation information to use for a transmission to a destination device, the source device may still initiate a channel estimation procedure. However the frequency of this procedure may be reduced because of the opportunistic measurements.

Embodiments of the present invention may also allow for measurements on broadcast transmissions that are corrupted to such an extent that the source address of the transmitter is not decodable. In some embodiments, all devices on the network are given the schedule of devices that transmit in the next frame. This schedule may be transmitted in a control transmission, which may be comprised within a beacon, at the beginning of each frame. Because a scheduled broadcast transmission can be measured without the need to decode the actual data, a greater proportion of broadcasts are usable for measurement. This further reduces the need to initiate the channel estimation procedure.

A schedule of broadcast opportunities transmitted at the beginning of each frame, or at some other time, may also specify broadcast opportunities which are not pre-assigned to a particular device. All devices may contend for these broadcast opportunities. Channel estimates on these broadcasts can be used when the information is successfully decoded at the receiver to identify the source device.

Embodiments of the present invention may centralize the management of channel bandwidth for the sounding process. In these embodiments, the CCo has knowledge of all the broadcast transmissions made by any device in the network. This knowledge comes from the CCo's control of scheduled broadcast opportunities and from its reception of all broadcast opportunities allocated for contention access. Since the CCo also has control over the allocation of timeslots and tones to connections, it can prioritize the allocation of channel bandwidth to the sounding process based on a global picture of the demands on the system. Other demands on network bandwidth include user traffic, discovery messaging, and control messaging. The CCo can manage these demands such that when possible broadcasts can fulfill dual purposes (e.g. user traffic and sounding, or discover messages and sounding) and otherwise manage the bandwidth demands of sounding to minimize its impact on user traffic.

Figure 7:
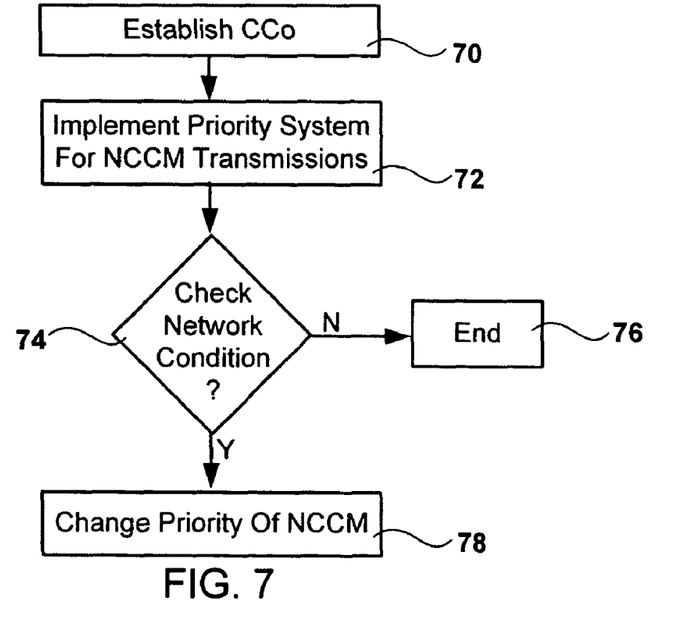
FIG. 7 is a chart showing steps of a method for establishing a priority for network channel characteristic measurements.

Some embodiments of the present invention may be described with reference to FIG. 7. In these embodiments, a CCo is established 70 and a priority system for Network Channel Characteristic Measurements (NCCMs) is implemented 72 by the CCo. Network channels are monitored 74 periodically or by some schedule either by the CCo directly, by network devices or by some combination of CCo and devices. When network conditions require frequent channel measurements, such as in powerline networks with fluctuating power demands, the priority of NCCM transmissions may be increased 78 to ensure that NCCM transmissions are granted sufficient bandwidth. When network conditions are stable or dedicated NCCM measurements are not necessary, such as when opportunistic measurements provide sufficient channel monitoring, the priority of NCCM may be left unchanged 76 or even decreased.

Figure 8:
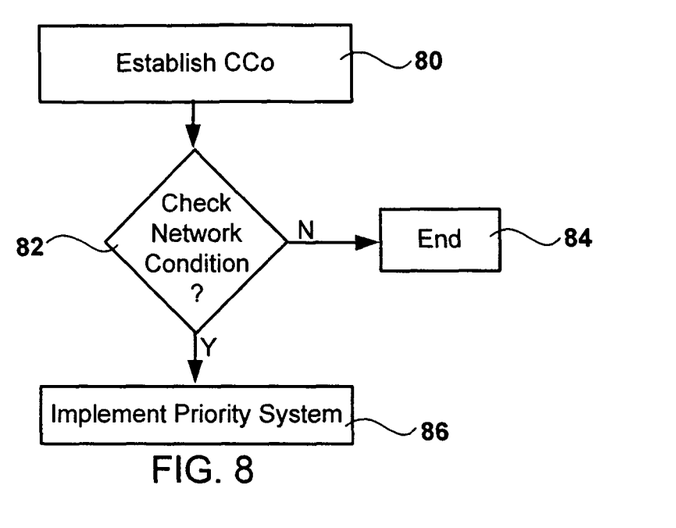
FIG. 8 is a chart showing steps of a method for establishing a priority for network channel characteristic measurements when a network condition exists.

In some embodiments, as illustrated in FIG. 8, a CCo may be established 80 for a network and the network channel conditions may be monitored 82. In these embodiments, a priority system for NCCM transmissions may not need to be implemented when channel conditions do not require significant dedicated NCCM activity 84. However, a priority system may be implemented 86 when conditions suggest a benefit from increased, dedicated NCCM transmissions.

In some embodiments, the CCo manages the allocation of tones to connections based on the QoS requirements of the various connections and the channel conditions between the communicating devices. The CCo may request the channel condition as measured by each device to keep its view of the state of the network up to date. The CCo may prioritize the requests for channel measurements to a very low level so that it has minimal impact on user traffic. If the CCo receives a request for a new connection and it does not have current channel measurements, it may prioritize the request for this information relatively high so that it can service the connection setup request quickly. If this request impacts the ability of the system to service user traffic, the CCo may attempt to reduce that impact by having the devices performing sounding measurements only return sounding result data for the sub-channels that are candidates for allocation (i.e., sounding measurements for already allocated channels will not be returned). In general, previous allocations by the CCo will eliminate a set of sub-channels from the list of sub-channels to consider for the new connection request. This reduced list of sounding results is a form of compression which reduces the overall demand on the network for sounding leaving more bandwidth for user traffic and at the same time reducing the overall latency of the connection establishment procedure.

Figure 9:
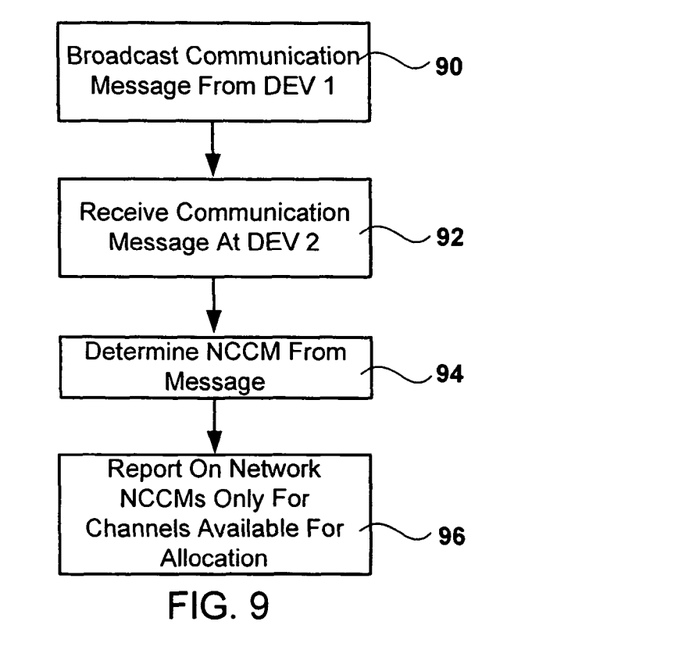
FIG. 9 is a chart showing steps of a method for measuring and reporting network channel characteristic measurements.

In some embodiments of the present invention, as illustrated in FIG. 9, a message is broadcast from a first network device 90 and received by a second network device 92. NCCMs are then determined from the message 94. These NCCMs may be performed for all network channels or tones or they may be performed for a subset of channels, such as the channels that are available for allocation. These NCCMs are reported to a CCo that maintains a log of network channel conditions. The report to the CCo may also be limited to a subset of network channels, such as the channels available for allocation 96. In these embodiments, the report to the CCo is shortened thereby decreasing bandwidth requirements for transmission. If the NCCMs are limited to a specific subset of channels, the processing overhead of the measurement process is also decreased.

Figure 10:
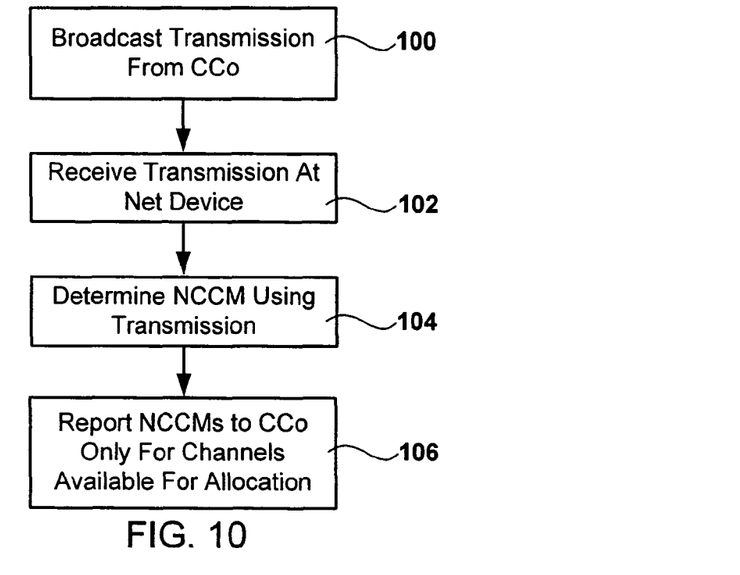
FIG. 10 is a chart showing steps of a method for measuring and reporting network channel characteristic measurements for only those channels available for allocation.

In some embodiments, as illustrated in FIG. 10, this principle can be applied to NCCMs based on CCo broadcasts as well. In these embodiments, a CCo broadcasts a message 100, such as a beacon transmission. The message is received 102 by a network device and the network device performs NCCMs 104 using the message. To eliminate unnecessary overhead, only data gathered from NCCMs for channels that are available for allocation, or some other channel subset, are reported 106 to the CCo.

Figure 11:
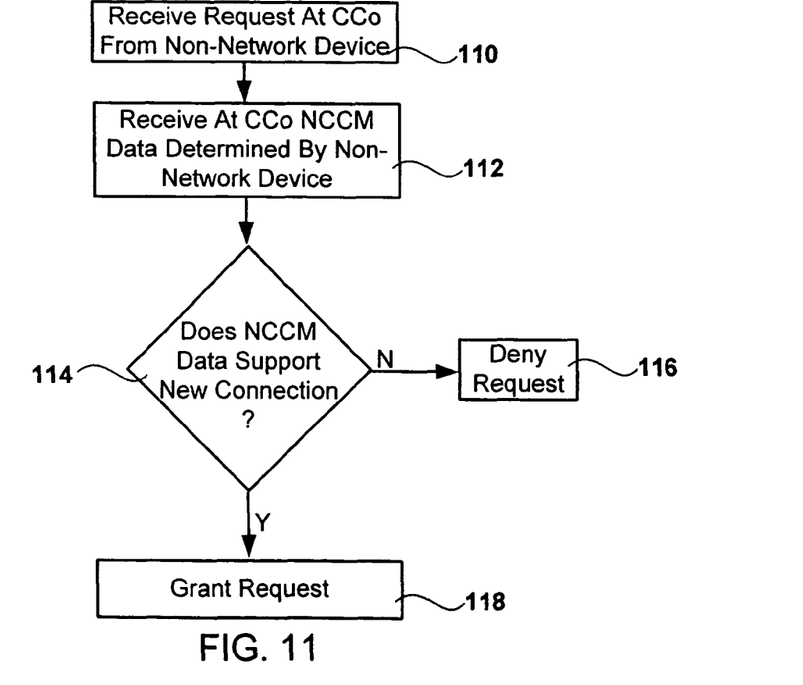
FIG. 11 is a chart showing steps of a method for measuring and reporting network channel characteristic measurements and requesting a connection.

In further embodiments, as illustrated in FIG. 11, a CCo may receive a request to join a network from a non-network device 110. The non-network device may measure NCCM data based on CCo broadcasts, such as a beacon transmission and other network device broadcasts. This NCCM data may also be transmitted to the CCo 112 to evaluate whether the network can support 114 a new connection with the non-network device. If the connection cannot be supported 116, the request is denied. If the connection can be supported 118, the request id granted.

Figure 12:
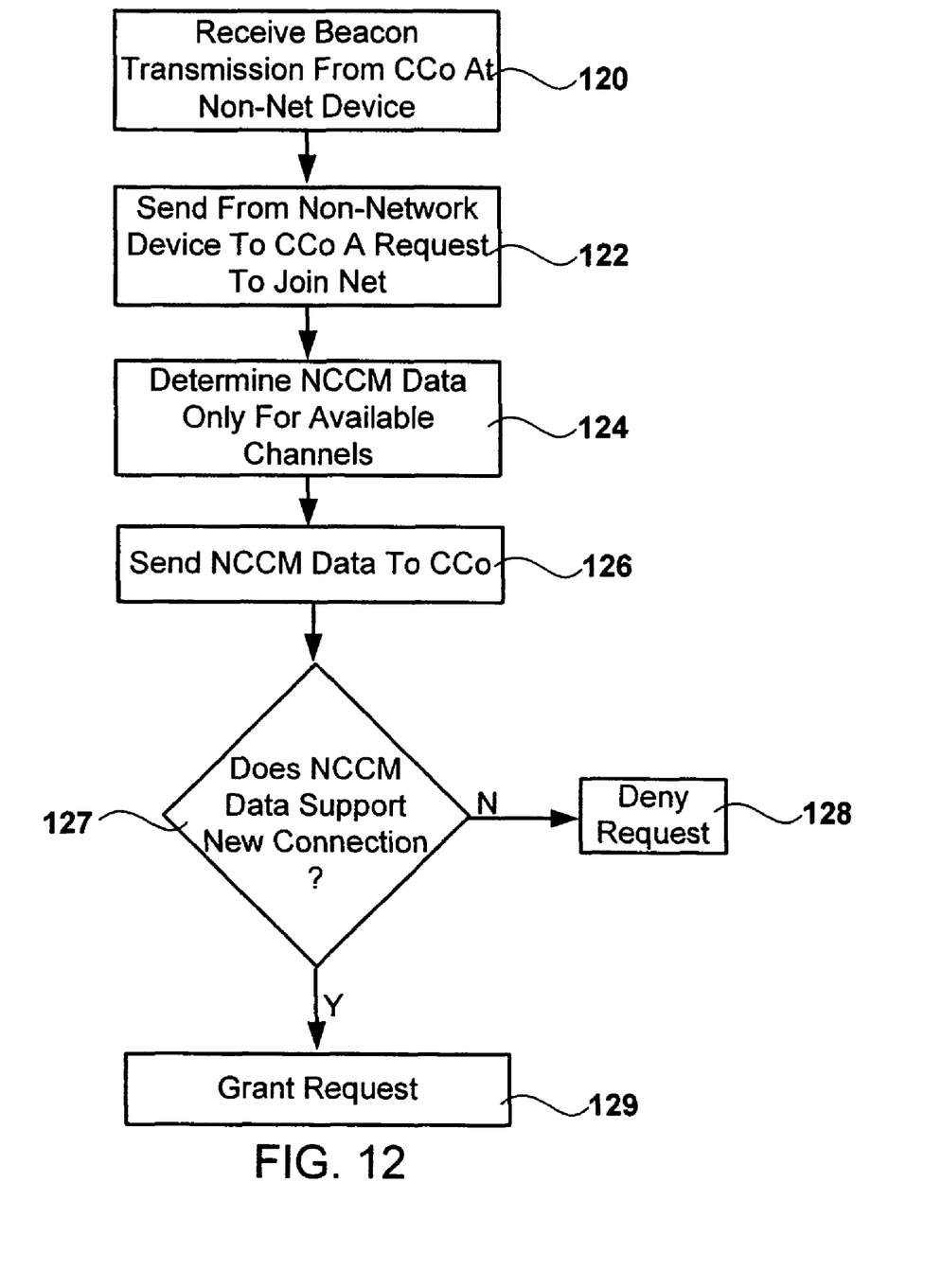
FIG. 12 is a chart showing steps of an alternative method for measuring and reporting network channel characteristic measurements and requesting a connection.

In similar embodiments, as illustrated in FIG. 12, non-network device (NND) receives a beacon transmission from a CCo 120. The NND sends a request to the CCo to join the network 122 and follows up by performing NCCMs on CCo and other network device transmissions. In these embodiments, NCCMs are only performed for channels that are available for allocation 124. In some alternative embodiments, NCCMs may be limited to another subset of the network channels. This limited set of NCCM data is then sent to the CCo 226. The CCo then uses this information to determine 127 whether a new connection can be supported. If the connection cannot be supported, the request may be denied 128. If the connection can be supported according to some criteria, the request may be granted 129.

The power line media is known to have dramatic changes in its channel characteristics. These changes are associated with events such as new equipment being connected to the power grid and equipment being switched on or off. Rapid detection of dramatic network characteristic changes and corrective actions by a network system help maintain the QoS of active connections. In an exemplary network system all devices may make sounding measurements on all scheduled broadcast opportunities. Devices, other than the CCo, have an opportunity to make channel measurements on the beacon transmission from the CCo every frame time. By comparing the sounding results from previous beacon transmissions, the devices can detect gross changes in the power line channel and may then inform the CCo of these detected changes. The CCo can then increase the priority or frequency of sounding measurements to optimize the network utilization of the new channel state.

Figure 13:
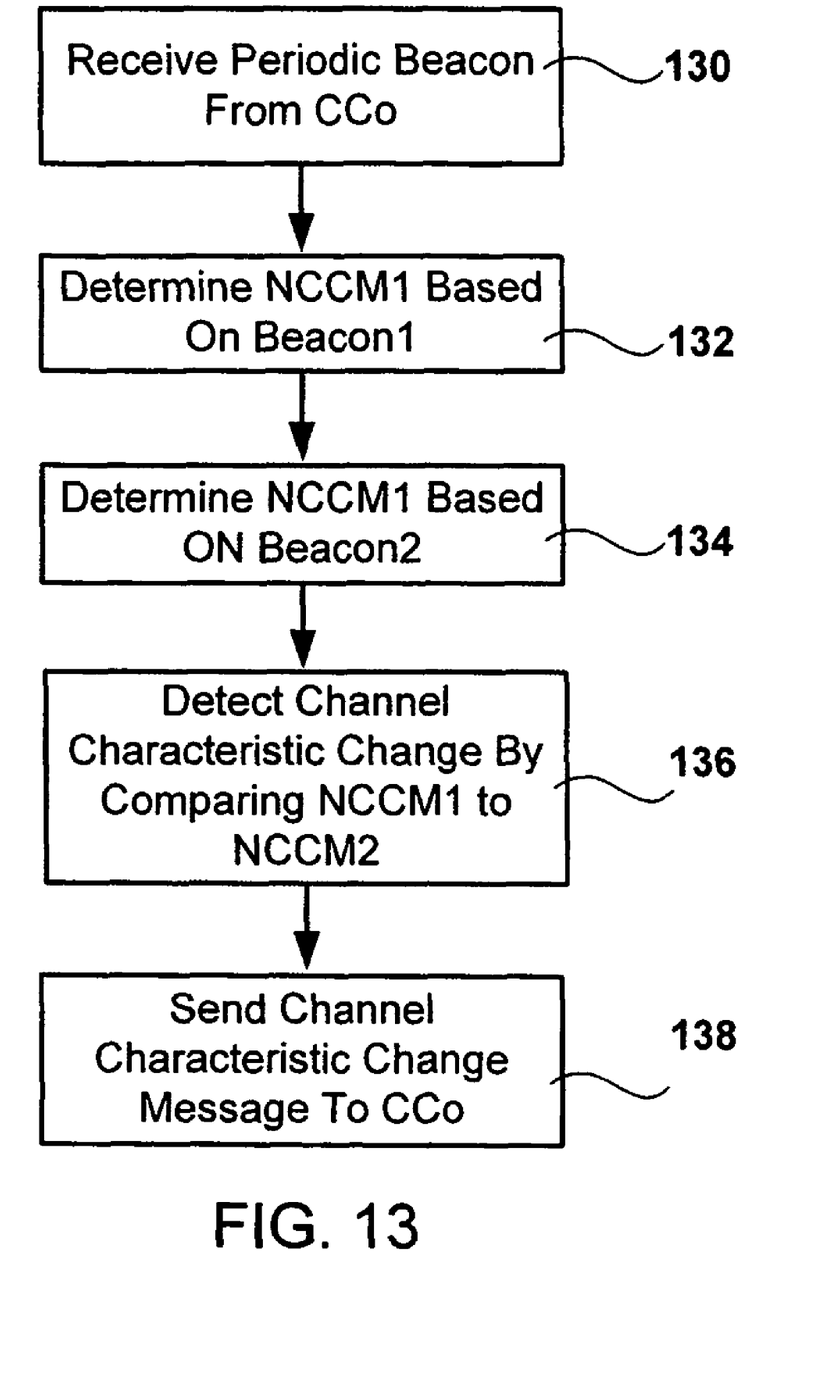
FIG. 13 is a chart showing steps of a method for measuring channel characteristic changes.

In some embodiments, as illustrated in FIG. 13, a network device may receive a periodic beacon message 130 from a CCo. An initial NCCM may be determined from a first periodic beacon message 132 and a subsequent NCCM may be determined 134 from a subsequent beacon message. These two NCCMs may be compared and otherwise evaluated to detect 136 changes in channel characteristics. When significant channel characteristic changes are detected, an alert message may be sent 138 to the CCo.

Figure 14:
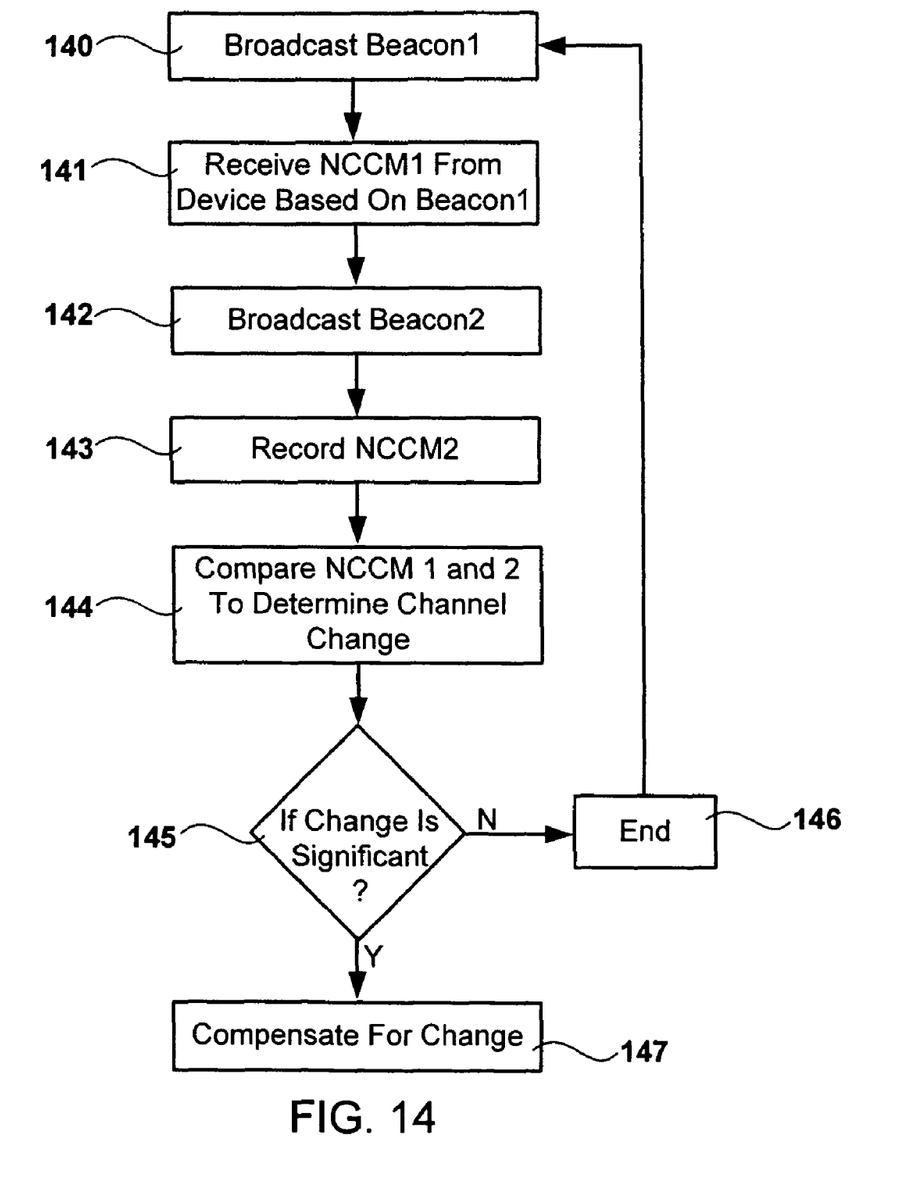
FIG. 14 is a chart showing steps of a method for measuring channel characteristic changes and compensating for the changes.

In some CCo embodiments, as illustrated in FIG. 14, a CCo may broadcast a periodic beacon transmission 140, which is used by a network device to perform an initial NCCM. The network device then reports this NCCM to the CCo. Another subsequent beacon transmission is then broadcast 142 and the network device performs its NCCM and reports back to the CCo 143. The CCo then compares and evaluates the two NCCMs 144 to determine whether a significant change has occurred in the network conditions 145. If a significant change has not occurred, the process may repeat or end 146. If a significant change has occurred, the CCo may compensate for the change 147, by changing QoS parameters, NCCM transmission priority or some other network parameter.

Figure 15:
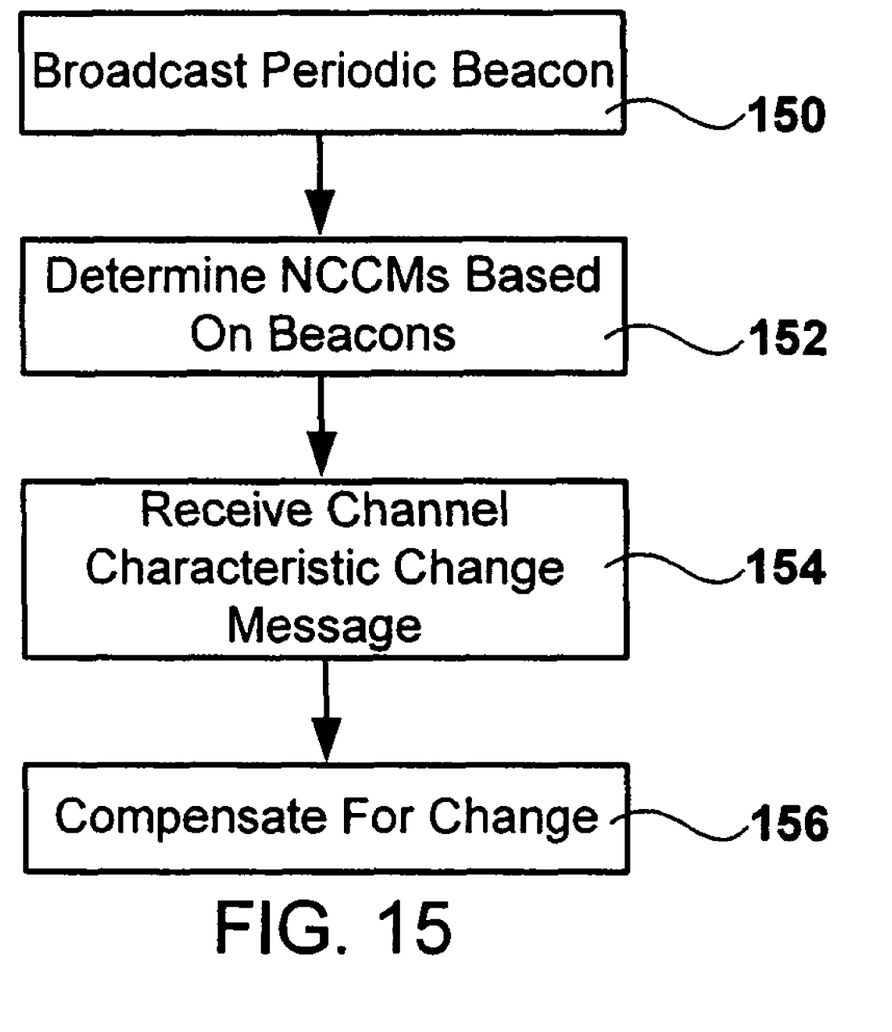
FIG. 15 is a chart showing steps of a method for receiving a channel characteristic change message and compensating for the change.

In similar embodiments, as illustrated in FIG. 15, a beacon message is broadcast periodically 150 and NCCMs are performed by network devices 152. A network device then compares NCCM data to monitor network changes 154. When the device detects a significant network channel change, an alert message is sent to the CCo 154, which may then compensate 156 for the change by adjusting network parameters.

A CCo may also schedule a much higher rate of sounding by a device that is participating in a connection with stringent QoS parameters. Such a device may be pre-allocated a number of sounding opportunities (within the scheduler) before the connection is accepted so that the stringent QoS requirements can be maintained on a channel experiencing dynamic changes in its channel characteristics.

The purpose of sounding in network systems of some embodiments of the present invention is to gather sufficient information on the channel characteristics between all devices on the power line network so that a Central Bandwidth Manager (CBWM) can intelligently allocate sets of tones to physical channels. The sounding techniques used in the system of these embodiments take advantage of the fact that there exists a central coordinator (CCo) device which is able to manage the sounding process with a global perspective of the demands on the system and the performance of the network between all devices.

Sounding may be characterized as the process by which a CBWM collects and maintains up-to-date information on the quality of the physical channels between individual devices in the network. Sounding may be an ongoing process in which all devices participate. In some exemplary embodiments, the process may comprise the following stages:

Every device in the network measures the received signal strength (RSS) and judges the bit loading estimate (BLE) for each tone based on broadcast transmissions. These broadcasts carry the identity of the transmitting device. This enables each receiving device to estimate the RSS and BLE for each device pair. Every device must maintain up-to-date BLE and RSS information for every device pair in the network by listening to transmissions over the broadcast channels.

The CBWM must schedule opportunities for devices to transmit over the broadcast channels periodically so other devices may listen and update their RSS and BLE information for links between the source device and all listening devices. The CBWM may favor devices with more network activity in scheduling broadcast channels.

The sounding results thus generated in the devices are collected and maintained current by the CCo. These results are sent to the CCo by the devices upon receipt of an explicit request message from the CCo. The device must respond with a report message.

The sounding results include the bit loading estimate per tone and a single received signal strength (RSS) measurement for the whole tone set, for each link between the device and every other device in the network.

In these exemplary embodiments, sounding results are used by the CCo in allocating tones to requested connections and setting the initial modulation density to be used on each allocated tone. The sounding procedure is only part of the procedure in the system for selecting the modulation type and bit density for each allocated tone. The process of selecting the final bit loading and modulation technique for each tone is called channel analysis and is a procedure that may involve only the two devices at either end of the connection.

In some embodiments of the present invention, broadcast transmissions may be used for channel measurements. All devices in the network may use any broadcast transmission for measuring channel performance. Each receiving device knows from the beacon which device is broadcasting thus eliminating the need to fully decode the broadcast transmission (works even with a bad CRC).

In some embodiments, contention broadcast channels are also usable for sounding purposes. However in this case, the contention broadcast transmission must be successfully decoded in order to identify the transmitter (source device).

Scheduled broadcast transmissions for the purpose of sounding compete with active connections and other demands for bandwidth allocations. In the systems of some embodiments, the relative priority of bandwidth requests for sounding can be adjusted on a source device by source device basis depending on system parameters and system state such as, but not limited to:
    QoS requirements of active connections
    history of the channel dynamics (estimation of how long the sounding measurements are valid)
    detection of a gross channel disruption
    age of last channel measurement
    QoS requirement of pending connection requests
    ability to combine sounding broadcast with pending control traffic, user traffic or discovery beacon.
    knowledge of any periodicity of the channel characteristics (e.g. 120 Hz bi-state channel characteristics, 6:30 AM automatic heating system start)

The sounding broadcast transmission can be intelligently scheduled such that no overhead is needed when it is combined with other needed transmissions. Sounding broadcasts are otherwise managed to have minimal impact on higher priority traffic such as that carrying user data.

Some embodiments of the present invention also achieve compression of sounding results. This may occur when only candidate tones returned as explained above. In a lightly loaded power line or other network the bandwidth required for sounding is of no consequence. In a heavily loaded system, the bandwidth required for sounding may be significant in that user or control traffic may be delayed to provide bandwidth for sounding (in the hopes of an overall increase in network utilization). In both a TDM and OFDM system as well as other systems, the results from sounding may be compressed in an attempt to reduce the BW required to return the results to the CCo. In an exemplary system with OFDMA, only the tones which are candidates for allocation (there exist excluded tones due to previous allocations) need be returned to the CCo. This is particularly important when a request for connection establishment must wait on the return of sounding results from a device to the CCo. The elimination of tones which are not candidate tones for the connection reduces the overall latency of the connection establishment procedure.

In some embodiments of the present invention, fast detection of channel state changes provides advantages. In some network system embodiments, all devices make sounding measurements on all scheduled broadcast opportunities. Devices, other than the CCo, have an opportunity to make channel measurements from the CCo every frame time at the beacon transmissions. By comparing the sounding results from previous Beacon transmissions, the devices can detect gross changes in the power line channel and may then inform the CCo of these detected changes. The CCo can then increase the priority or frequency of sounding measurements to optimize the network utilization of the new channel state. The CCo can also schedule a much higher rate of sounding by a device that is participating in a connection with stringent QoS parameters. Such a device may be pre-allocated a number of sounding opportunities (within the scheduler) before the connection is accepted so that the stringent QoS requirements can be maintained on a channel experiencing dynamic channel characteristics.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for scheduling network channel characteristic measurement transmissions, said method comprising:
    a) establishing a central network coordinator (CCo) that receives bandwidth requests from network devices and allocates bandwidth to said network devices;
    b) implementing a conditionally-variable priority system for bandwidth allocation wherein said CCo distinguishes between requests for transmissions with the sole purpose of network channel characteristic measurement (NCCM) comprising no user traffic and other transmissions comprising user traffic, wherein priority in said priority system, for said NCCM requests varies with the occurrence of a network condition, wherein said network condition is selected from the set consisting of a known periodic channel disruption, an inability to combine NCCM transmissions with other transmissions, a historical record of high channel dynamics and a gross channel disruption; and
    c) assigning a priority to said NCCM transmissions without user traffic that is different than a priority assigned to said other transmissions with user traffic when at least one of said network conditions is detected.

2. A method as described in claim 1 wherein said assigned priority is a high priority and said network condition is said gross channel disruption.

3. A method as described in claim 1 wherein said assigned priority is a high priority and said network condition is said historical record of high channel dynamics.

4. A method as described in claim 1 wherein said assigned priority is a high priority and said network condition is said inability to combine NCCM transmissions with other transmissions.

5. A method as described in claim 1 wherein said assigned priority is a low priority and said network condition is a successful completion of a combined NCCM transmission with another transmission.

6. A method as described in claim 1 wherein said assigned priority is a high priority and said network condition is said known periodic channel disruption.

7. A method as described in claim 6 wherein said priority is assigned before said known periodic channel disruption occurs and said priority remains in effect until said disruption subsides.

8. A method for scheduling network channel estimation transmissions, said method comprising:
    a) establishing a central network coordinator (CCo) that receives bandwidth requests from network devices and allocates bandwidth to said network devices;
    b) implementing a conditionally-variable priority system for bandwidth allocation based on whether a transmission's purpose is primarily for channel estimation, wherein said CCo distinguishes between requests for transmissions that are primarily for channel estimation without user traffic and other transmissions comprising user traffic, wherein said conditionally-variable priority system varies the priority of said transmissions primarily for channel estimation according to the occurrence of network conditions; and
    c) assigning an increased priority to said channel estimation transmissions without user traffic that is greater than a priority assigned to said other transmissions with user traffic when a network condition is detected, wherein said condition is selected from the set consisting of a known periodic channel disruption, an inability to combine NCCM transmissions with other transmissions, a historical record of high channel dynamics and a gross channel disruption.

9. A method for scheduling network channel estimation transmissions, said method comprising:
    a) determining, via a central network coordinator (CCo) that receives bandwidth requests from network devices and allocates bandwidth to said network devices, whether a bandwidth request is associated with a transmission having the primary purpose of channel estimation or the primary purpose of user traffic transmission;
    b) assigning a first priority, based on said determining, to said bandwidth request if said bandwidth request is associated with a transmission having the primary purpose of channel estimation, when a network condition occurs, wherein said network condition is selected from the set consisting of a known periodic channel disruption, an inability to combine NCCM transmissions with other transmissions, a historical record of high channel dynamics and a gross channel disruption;
    c) assigning a second priority, based on said determining, to said bandwidth request if said bandwidth request is associated with a transmission having the primary purpose of channel estimation, when said network condition does not occur; and
    d) assigning a third priority, based on said determining, to said bandwidth request if said bandwidth request is associated with a transmission having the primary purpose of user traffic transmission.

* * * * *